(12) United States Patent
Augustine et al.

(10) Patent No.: US 7,879,759 B2
(45) Date of Patent: Feb. 1, 2011

(54) MOBILE DENO$_x$ CATALYST

(76) Inventors: Steve M. Augustine, 4380 Doncaster Dr., Ellicott City, MD (US) 21043; Guoyi Fu, 10201 Camelford Ct., Ellicott City, MD (US) 21042; Mark Watson, 4416 Westbrook La., Kensington, MD (US) 20895

( * ) Notice: Subject to any disclaimer, the term of this patent is extended or adjusted under 35 U.S.C. 154(b) by 166 days.

(21) Appl. No.: 12/371,760

(22) Filed: Feb. 16, 2009

(65) Prior Publication Data

US 2010/0209323 A1 Aug. 19, 2010

(51) Int. Cl.
| | |
|---|---|
| *B01J 23/00* | (2006.01) |
| *B01J 23/10* | (2006.01) |
| *B01J 23/70* | (2006.01) |
| *B01J 23/74* | (2006.01) |
| *B01J 8/02* | (2006.01) |
| *B01J 8/00* | (2006.01) |
| *B01D 53/56* | (2006.01) |
| *B01D 53/94* | (2006.01) |
| *B01D 53/86* | (2006.01) |
| *C01B 21/00* | (2006.01) |
| *C01B 23/00* | (2006.01) |
| *C01B 25/00* | (2006.01) |
| *C01B 31/00* | (2006.01) |
| *C01B 33/00* | (2006.01) |
| *C01B 35/00* | (2006.01) |
| *C01G 28/00* | (2006.01) |
| *C01G 30/00* | (2006.01) |
| *C01G 25/02* | (2006.01) |
| *C01G 23/00* | (2006.01) |
| *C02F 1/70* | (2006.01) |

(52) U.S. Cl. .................. 502/350; 502/349; 502/304; 502/324; 502/338; 423/213.2; 423/239.1; 423/598; 423/594.12; 210/757

(58) Field of Classification Search .................. 502/349, 502/350, 304, 324, 338; 423/213.2, 239.1, 423/598, 594.12; 210/757
See application file for complete search history.

(56) References Cited

U.S. PATENT DOCUMENTS 4,221,768 A * 9/1980 Inoue et al. ............ 423/239.1

(Continued)

FOREIGN PATENT DOCUMENTS

EP 0299294 B1 5/1992

(Continued)

OTHER PUBLICATIONS

Wan et al. "Preparation of titania-zirconia composite aerogel material by sol-gel combined with superficial fluid drying", Applied Catalysis A: General 277 (2004) 55-59.*

(Continued)

*Primary Examiner*—Stanley Silverman
*Assistant Examiner*—Anthony J Zimmer
(74) *Attorney, Agent, or Firm*—Dunlap Codding, P.C.

(57) ABSTRACT

DeNOx catalysts for the reduction of NOx compounds and porous catalyst support materials are provided. The inventive catalysts comprise an active metal catalyst component and mixed $TiO_2/ZrO_2$ porous support particles that comprise a) a crystalline phase comprising titanium dioxide and/or a titanium/zirconium mixed oxide, b) an amorphous phase comprising zirconium, and c) a small amount of one or more metal oxide(s) or metalloid oxide(s) deposited on the amorphous outer layer. The inventive catalysts exhibit superior activity and ammonia selectivity.

31 Claims, 5 Drawing Sheets

1. Crystalline phase anatase $TiO_2$   2. Amorphous phase enriched in zirconium

U.S. PATENT DOCUMENTS

| | | | |
|---|---|---|---|
| 4,833,113 A | | 5/1989 | Imanari et al. |
| 4,855,115 A | | 8/1989 | Imanari et al. |
| 5,021,392 A | | 6/1991 | Daly et al. |
| 5,684,116 A | * | 11/1997 | Martl et al. .................. 528/176 |
| 5,948,723 A | * | 9/1999 | Sung ........................... 502/303 |
| 6,391,276 B1 | * | 5/2002 | Suda et al. ................... 423/598 |
| 6,511,642 B1 | * | 1/2003 | Hatanaka et al. ......... 423/239.1 |
| 6,852,665 B2 | * | 2/2005 | Morikawa et al. ........... 502/302 |
| 7,247,283 B2 | | 7/2007 | Hedouin |
| 2005/0069639 A1 | * | 3/2005 | Ogata et al. .................. 427/180 |
| 2005/0137084 A1 | * | 6/2005 | Krisko et al. ................ 502/349 |
| 2005/0233899 A1 | * | 10/2005 | Anzaki et al. ............... 502/350 |
| 2006/0029535 A1 | | 2/2006 | Ott |
| 2006/0084569 A1 | | 4/2006 | Augustine et al. |
| 2008/0274876 A1 | | 11/2008 | Ott |

FOREIGN PATENT DOCUMENTS

| | | |
|---|---|---|
| EP | 0738179 B1 | 4/1999 |
| JP | 2003/093880 A | 4/2003 |
| JP | 2006/068663 A | 3/2006 |
| WO | WO 2004022229 | 3/2004 |

OTHER PUBLICATIONS

Takahashi et al. "Sulfur durability of NOx storage and reduction catalyst with supports of TiO2, ZrO2, and ZrO2-TiO2", Applied Catalysis B: Enviornmental 72 (2007) 187-195.*

Mao et al. "Catalytic performance of B2O3/TiO2-ZrO2 for vapor-phase Beckmann rearrangement of cyclohexane oxime: the effect of boria loading", Catalysis Letters vol. 77, No. 1-3, 2001.*

Reddy et al. "Recent Advances on TiO2-ZrO2 Mixed Oxides and Catalysts and Catalyst Supports", Catalysis Reviews, 47:257-296, 2005.*

* cited by examiner

1. Crystalline phase anatase $TiO_2$  2. Amorphous phase enriched in zirconium

1. Amorphous phase enriched in zirconium. 2. crystalline phase: titanium/zirconium mixed oxide in a molar ratio of 2:1, titanium to zirconium, often called "srilankite"

Figure 3. Transmission electron microscopy images of catalyst supports : Left image : porous support of the invention produced from sulfate precursors. Right image: support produced by the prior art process of U.S. 4,221,768.

Scanning electron microscopy images of catalyst supports; Left image : porous support of the invention produced from sulfate precursors. Right image: support produced by the prior art process of U.S. 4,221,768.

MOBILE DENO$_x$ CATALYST

FIELD OF INVENTION

The present invention relates to catalysts for reducing NOx compounds from exhaust gases and waste gases from combustion processes. More particularly, the invention relates to metal oxide catalysts supported on a unique porous metal oxide support material for selective catalytic reduction (SCR) processes.

BACKGROUND OF THE INVENTION

When burning fossil fuels to produce energy, one typically uses a high temperature combustion process in the presence of air. Unfortunately, this type of process produces both nitrogen oxides (NOx), which are well-known pollutants, and other components that are harmful to health or the environment, such as carbon monoxide and unburned hydrocarbons. Thus, it is important to remove these materials prior to their release into the environment.

There have been many investigations into methods that allow for the removal of these substances. Two methods that are known are combustion modifications and adsorption techniques. Unfortunately, each of these has its disadvantage. The former allows for only limited maximum removal of NOx, and the latter has limited capacity.

A third method for addressing the problem of noxious exhaust gases is catalytic removal, which by comparison, is extremely effective in removing large proportions of unwanted exhaust components and is capable of treating very large volumes of exit gases for long periods of time. In order to effect the reduction of NOx in exhaust gases through catalytic reduction processes, it is necessary either to introduce a reducing agent, such as ammonia, and/or to use the unburned hydrocarbons present in the waste gas effluent.

The selective catalytic reduction (SCR) process consists of the reduction of NOx, (NO, $N_2O$ and $NO_2$) species using ammonia as a reductant in the presence of oxygen and a catalyst to produce nitrogen and water. The SCR process is widely used in the U.S., Japan, and Europe to reduce emissions of large utility boilers and other commercial applications. Increasingly, SCR processes are being used to reduce emissions in mobile applications such as in large diesel engines like those found on ships, diesel locomotives, automobiles and the like.

Various catalysts have been used in SCR processes. Initial catalysts, which employed platinum or platinum group metals, were found unsatisfactory because of the need to operate in a temperature range in which explosive ammonium nitrate forms. In response to environmental regulations in Japan, the first vanadium/titanium SCR catalyst was developed, which has proven to be highly successful. Further development has resulted in the development of vanadium catalyst deposited on titanium oxide/tungsten oxide support material.

Although vanadium catalysts supported on titanium oxide/tungsten oxide provide excellent performance, the potential toxicity of vanadium oxide has led to health concerns regarding the use of SCR catalysts for mobile applications. Presently, there are no alternatives that rival the performance of the high performance vanadium pentoxide catalysts supported on tungsten oxide/titanium oxide.

One alternative catalyst technology being proposed are transition metals supported on zeolites such as those under the trade name ZSM-5™ by Exxon-Mobile. Such catalysts are described, for example, in U.S. Patent Publication No. US 2006/0029355, European Patent Application Publication No. EP 299294 A2, European Patent No. EP 738179 B1 and International Application Publication No. WO 2004/022229 A1. However, this technology is limited by the high cost of zeolite catalysts, which can be a factor of 10 more expensive than comparable titania-supported catalysts.

A number of publications describe various mixed oxide catalysts systems as NOx reduction catalysts. For example, U.S. Pat. No. 3,279,884 to Nennenmacher et al. describes the removal of NOx in an oxygen containing stream over catalytic metal oxides of $V_2O_5$, $WO_3$, $MoO_3$ or their mixtures.

U.S. Pat. No. 4,048,112 to Matsushita et al., describes the use of vanadia on anatase titania as effective NOx removal catalysts.

U.S. Pat. No. 4,085,193 to Nakajima et al., describes improved performance of NOx catalysts by supporting $V_2O_5$, $WO_3$, $MoO_3$ or their mixtures on titanium dioxide.

U.S. Pat. No. 4,221,768 to Inoue et al. describes NOx catalysts comprising mixed oxides of $TiO_2$—$SiO_2$ or $TiO_2$—$ZrO_2$—$SiO_2$, and identifies the innate acidity of the metal oxide support. The patent also describes the use of Mn, Ce, Fe, Zr, Si and Ti in DeNOx catalyst compositions.

U.S. Pat. No. 4,833,113 to Imanari et al. describes an improved DeNOx catalyst comprising an oxide of titanium, an oxide of tungsten and an oxide of vanadium having support with a surface area of 80-200 m$^2$/g and a pore volume of 0.1 to 0.5 mL/g.

Japanese Patent Publication JP 2003/093880 to Hirakawa et al., describes a catalyst comprising a composite oxide obtained by neutralizing a soluble titanium compound, a soluble silicon compound and further adding a soluble tungsten compound and at least one oxide of vanadium, molybdenum and tungsten.

U.S. Patent Application Publication No. 2006/0084569 to Augustine et al., describes a high activity DeNOx catalyst prepared by deposing vanadium oxide on a titania-supported metal oxide, such as tungsten oxide, where the supported metal oxide has an isoelectric point at a pH of less than or equal to 3.75 prior to depositing the vanadium.

U.S. Pat. No. to Suda et al. describes a titania-zirconia powder where at least part of the zirconia is dissolved in the titania crystalline phase or at least part of the titania solid is dissolved in the zirconia crystalline phase. Also described is a titania-zirconia-alumina powder.

U.S. Pat. No. 5,021,392 to Daly et al, describes binary oxidic catalyst support materials comprising titania and zirconia prepared by a pH swing technique or a constant pH technique followed by calcination below 450° C.

U.S. Pat. No. 7,247,283 to Hedouin describes a mixed zirconium-titanium oxide comprising between 30% to 40% by weight titanium oxide and either a pure $ZrTiO_4$ or a mixture of phases of $ZrTiO_4$ and anatase. produced by thermal hydrolysis of a zirconium compound and a titanium compound.

Japanese Patent Publication JP2006068663 describes a catalyst for the treatment of exhaust gas that contains a Ti—Si composite oxide and/or a Ti—Zr composite oxide and an oxide of manganese. The publication also describes that the catalyst may also comprise an oxide of copper, chromium, iron, vanadium tungsten, nickel or molybdenum.

U.S. Pat. No. 4,855,115 to Imanari et al. describes a DeNOx catalyst comprising an oxide of titanium, and oxide of at least one of tungsten and molybdenum, an oxide of vanadium and an oxide and/or a sulfate of at least one of yttrium, lanthanum, cerium, neodymium. The patent also describes a catalyst that comprises a metal selected from yttrium, lanthanum, cerium neodymium, copper, cobalt, manganese and iron deposited on zeolite.

A common SCR catalyst support sold under the trade name DT52™ by Millennium Inorganic Chemicals, Inc. contains tungsten oxide deposited on titanium oxide. It requires the further addition of vanadium pentoxide to become a functioning catalyst having excellent activity which has been a standard catalyst for SCR processes since its introduction in the late 1980's.

Despite the various mixed oxide catalysts being developed and the zeolite supported catalysts, there exists a need for low cost vanadium-free catalysts that provide high catalytic activity in the SCR reaction.

SUMMARY OF THE INVENTION

A composition for the catalytic reduction of NOx compounds, comprising an active catalyst component deposited on the surface of a porous support; wherein said active catalyst component comprises one or more first metal(s) and/or metal oxide(s); and wherein said porous support comprises:
a) a crystalline phase comprising titanium dioxide, a titanium-zirconium mixed oxide or a mixture of titanium dioxide and a titanium-zirconium mixed oxide;
b) an amorphous phase that comprises zirconium oxide; and
c) about 0.1% to about 5% by weight of one or more second metal oxide(s) and/or metalloid oxide(s) deposited on the surface of said catalyst support;
wherein said first metal(s) and/or metal oxide(s) exhibit catalytic activity for the reduction of NOx compounds; and greater than 25% of the pore volume of the catalyst support is comprised of pores with a diameter greater than 150 angstroms.

In one embodiment, the crystalline phase of the porous support comprises anatase titanium dioxide. In another embodiment, the crystalline phase comprises a titanium/zirconium mixed oxide. In a preferred embodiment, the molar ratio of titanium to zirconium in the titanium/zirconium mixed oxide is about 2:1.

Typically, the amorphous phase of the porous support is present on the surface of the crystalline phase.

In one embodiment, the crystalline phase of the porous support comprises about 90 mol % to about 100 mol % anatase titanium dioxide and a mixed titanium/zirconium mixed oxide. In another embodiment of the invention, the crystalline phase of the porous support comprises about 95 mol % to about 100 mol % anatase titanium dioxide and a mixed titanium/zirconium mixed oxide.

In a particular embodiment, the active metal catalyst component is an oxide of manganese, iron, cerium, or a combination thereof.

In another embodiment, the composition comprises a porous support that comprises about 0.1% to about 5% by weight of titanium dioxide on the surface. In some embodiments, the porous support comprises a molar ratio of titanium to zirconium of about 60:40 to about 95:5 and about 0.1% to about 5% by weight of titanium dioxide on the surface. In another embodiment, the porous support comprises a molar ratio of titanium to zirconium of about 65:35 to about 85:15 and about 0.1% to about 5% by weight of titanium dioxide on the surface. In still another embodiment of the invention, the porous support comprises a molar ratio of titanium to zirconium of about 75:25 to about 90:10 and about 0.1% to about 5% by weight of titanium dioxide on the surface.

In one embodiment, the composition comprises about 1% to about 20% active catalyst component by weight of the composition. In another embodiment, the composition comprises about 5% to about 10% active catalyst component by weight of the composition.

The present invention also provides a porous catalyst support for supporting an active DeNOx catalyst component. The porous support comprises a) a crystalline phase that comprises titanium dioxide, a titanium-zirconium mixed oxide or a mixture of titanium dioxide and the titanium-zirconium mixed oxide; b) an amorphous phase that comprises zirconium oxide; and c) about 0.1% to about 5% by weight of one or more metal oxide(s) and/or metalloid oxide(s) deposited on the surface of the crystalline and/or amorphous phases of the support particles. The metal oxide(s) or metalloid oxide(s) deposited on the surface of the titanium-zirconium particles are not typically substantially active in the reduction of NOx compounds. Generally, greater than 25% of the pore volume of the inventive porous support is comprised of pores with a diameter of greater than 150 angstroms.

Also provided is a method for the preparation of a composition for the catalytic reduction of NOx species comprising:
a) contacting a mixture of a soluble titanyl salt and a soluble zirconyl salt with an aqueous solvent at a pH of about 4 to about 12 in the presence of a sulfate compound to precipitate a $TiO_2/ZrO_2$ porous support comprising a crystalline phase and an amorphous phase;
wherein the crystalline phase comprises $TiO_2$, $ZrO_2$ and/or a mixed $TiO_2/ZrO_2$ mixed oxide; and wherein the amorphous phase comprises $ZrO_2$;
b) contacting the $TiO_2/ZrO_2$ porous support of step b) with precursors of one or more metal oxide(s) and/or metalloid oxide(s) to produce a $TiO_2/ZrO_2$ porous support comprising 0.1% to 2% by weight of one or more metal oxide(s) or metalloid oxide(s) on the surface of said porous support; and
c) contacting the $TiO_2/ZrO_2$ porous support comprising 0.1% to 2% by weight of a metal oxide(s) or metalloid oxide(s) of step c) with one or more active catalyst precursors to deposit an active catalyst component on the $TiO_2/ZrO_2$ porous support; and
d) contacting the $TiO_2/ZrO_2$ porous support of step c) with an aqueous mixture comprising a carbonate or bicarbonate salt to form a catalytic composition.

In one embodiment of the method, the metal oxide in step c) is titanium dioxide. In another embodiment, the active catalyst component is an oxide of manganese, iron, cerium or a combination thereof.

In another embodiment of the method, the crystalline phase of the $TiO_2/ZrO_2$ porous support comprises anatase titanium dioxide. In still another embodiment of the method, the crystalline phase of the $TiO_2/ZrO_2$ catalyst support particles comprises a titanium/zirconium mixed oxide. Preferably, the titanium/zirconium mixed oxide has a molar ratio of about 2:1, titanium to zirconium.

In one embodiment of the method, the crystalline phase of the $TiO_2/ZrO_2$ porous support comprises about 90 mol % to about 100 mol % anatase titanium dioxide and a mixed titanium/zirconium mixed oxide. In another embodiment, the crystalline phase comprises about 95 mol % to about 100 mol % anatase titanium dioxide and a mixed titanium/zirconium mixed oxide.

In a particular embodiment, the carbonate or bicarbonate salt in step b) of the method is ammonium carbonate.

In one embodiment, the method comprises filtering the $TiO_2/ZrO_2$ porous support after step c) and washing the solid to remove spectator ions until the conductivity of the wash liquors is less than or equal to 100 mS/cm. In another embodiment, the method comprises filtering the composition of step d) and washing the solid to remove spectator ions until the conductivity of the wash liquors is less than or equal to 100 mS/cm.

In still another embodiment, the $TiO_2/ZrO_2$ porous support is dried after step c).

Preferably, the method comprises calcining the composition after step d). Typically, the composition is calcined at a temperature of between 400° C. and 700° C. for 2 to 10 hours.

The present invention also provides a method for the preparation of a porous catalyst support, which comprises steps a), b) and d) of the method for the preparation of a composition for the catalytic reduction of NOx compounds described above.

Further, the invention provides a method for the reduction of NOx compounds in a gas or liquid, which comprises contacting the gas of liquid with the composition for the catalytic reduction of NOx compounds described above for a time sufficient to reduce the level of NOx compounds in the gas or liquid.

The inventive catalysts compositions described herein exhibit excellent performance for the reduction of NOx compounds. At 250° C., the inventive catalyst compositions exhibit superior conversion of NO compared to the state of the art $V_2O_5$ catalyst. At higher temperatures, such as 350° C., the catalysts of the invention approach the performance of the vanadia catalysts.

These and other aspects of the present invention will be better understood by reference to the following detailed description and accompanying figures.

DETAILED DESCRIPTION

Figure 1:
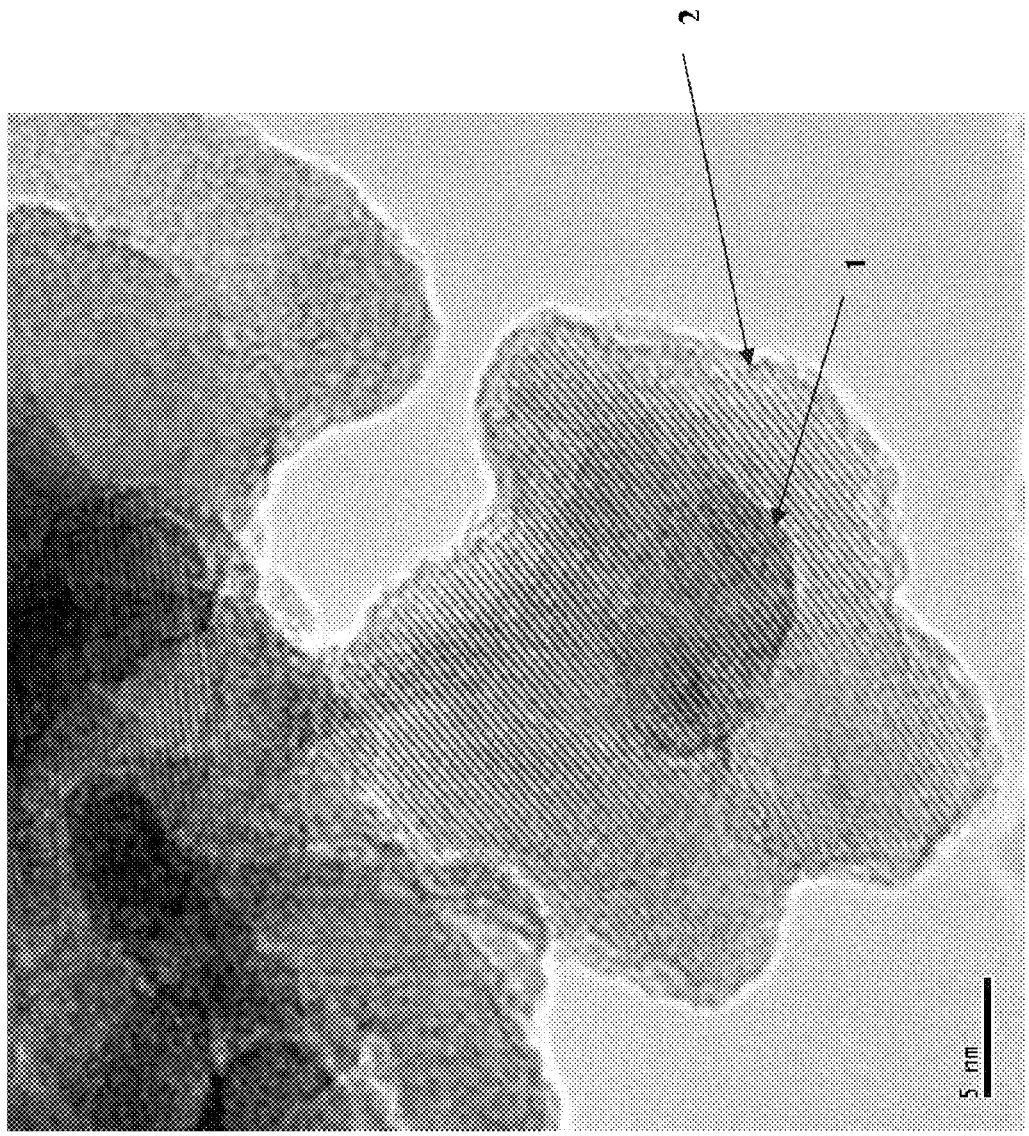
FIG. 1 shows the transmission electron microscopy (TEM) image of the porous support material of the invention. Arrow 1 points to a crystalline phase of anatase $TiO_2$ and arrow 2 points to an amorphous metal oxide phase enriched in zirconium.

Provided herein are DeNOx catalysts comprising an active metal component deposited on a porous $TiO_2/ZrO_2$ support material. Also provided herein is a unique porous support material for metal oxide DeNOx catalysts. The inventive $TiO_2/ZrO_2$ support material exhibits greater porosity and larger pores than prior art catalyst supports. The greater porosity and larger pores of the inventive $TiO_2/ZrO_2$ support material results in improved catalytic activity, such as conversion and selectivity and lower levels of $N_2O$ by-product formation.

Also provided is a method for the preparation of the porous support of the invention and a method for the preparation of a catalytic composition comprising the porous support and an active catalyst component. In addition, a method for the reduction of NOx compounds in a liquid or gas with the catalytic composition of the invention is provided.

In a preferred embodiment, the DeNOx catalysts of the invention contain substantially no vanadium.

The inventive porous support structure comprises a crystalline phase of either anatase or rutile $TiO_2$ and/or a Zr—Ti mixed oxide often called "srilankite" and an amorphous phase that comprises zirconium oxide. In some embodiments, a small amount of one or more metal oxide(s) or metalloid oxide(s) are deposited on the surface of the porous $TiO_2/ZrO_2$ support material prior to depositing the active metal component.

In one preferred embodiment, the active metal catalyst component comprises manganese. In another preferred embodiment, the active metal component comprises iron. A third preferred embodiment has cerium as the active metal component. In still another embodiment, the active catalyst component will comprise mixtures of metals and/or metal oxides, including but not limited to, mixtures of two or more oxides of manganese, iron and cerium.

The inventive DeNOx catalysts exhibit superior activity and ammonia selectivity compared to prior art catalysts that do not comprise the porous $TiO_2/ZrO_2$ support material of the invention. In particular, the inventive catalysts exhibit improved conversion of NOx at both low and high temperatures, improved selectivity for $NH_3$ and reduced tendency to produce $N_2O$. The superior low temperature activity of the inventive catalysts is especially useful for mobile DeNOx applications.

Definitions

All terms used herein are intended to have their ordinary meaning unless otherwise provided.

Unless otherwise specified, all reference to percentage (%) herein refers to percent by weight.

The terms "catalyst support," "support particles," or "support material" are intended to have their standard meaning in the art and refer to particles comprising $TiO_2/ZrO_2$ on the surface of which an active metal component is deposited. The support material of the invention comprise a crystalline phase and an amorphous phase.

The terms "active metal catalyst" or "active component" refer to the active component deposited on the surface of the support material that catalyzes the reduction of NOx compounds.

The term "catalyst" is intended to have its standard meaning in the art and refers to the combination of the active metal catalyst supported on the $TiO_2/ZrO_2$ catalyst support particles.

The phrase "substantially not active as a DeNOx catalyst" or "substantially not catalytically active" means that the material is not active in the selective catalytic reduction (SCR) of NOx compounds compared to a known active component when deposited on the surface of a porous support at the same concentration. In some embodiments a "substantially not catalytically active" material exhibits less than about 25% of the catalytic activity of an active catalyst component.

The phrase "substantially no vanadium" refers to material that contains no vanadium or only low levels of vanadium that do not contribute to the catalytic activity of the catalysts.

All references including patent applications and publications cited herein are incorporated herein by reference in their entirety and for all purposes to the same extent as if each individual publication or patent or patent application was specifically and individually indicated to be incorporated by reference in its entirety for all purposes. Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

Vanadium on tungsten catalysts with a titania support are currently the state of the art for selective catalytic reductions (SCR) of NOx species with ammonia to produce nitrogen and water. However, there are concerns with using vanadium because of its toxicity and relative volatility. Therefore, alternative catalysts that efficiently and selectively catalyze the reduction of NOx to nitrogen and water are needed. Alternative catalysts that address the toxicity and volatility issues of vanadium SCR catalysts have other limitations. For example, manganese catalysts exhibit good activity in reducing NOx species at lower temperature but suffer from lower selectivity at higher temperature, which results in side reactions that convert ammonia to undesirable compounds such as $N_2O$ rather than $N_2$. In one embodiment, the present invention provides improved SCR catalysts comprising substantially no vanadium on a unique porous support that exhibit improved catalytic activity, such as improved conversion at low and high temperature; improved $NH_3$ selectivity, particularly at high temperature; and reduced levels of $N_2O$ formation.

The invention provides a unique porous support that comprises a) a crystalline phase comprising anatase and/or rutile $TiO_2$, and/or a mixed Ti/Zr oxide, b) an amorphous phase comprising zirconium; and c) optionally a small amount of one or more metal oxide(s) or metalloid oxide(s) deposited on the surface of the support material. The catalytic compositions comprising the porous support and an active catalyst component exhibit improved activity and selectivity in the selective catalytic reduction of NOx compounds. Typically, the porous support will also comprise a sulfate component, which may be a titanyl or zirconyl sulfate. In some embodiments, the sulfate component is present at a concentration of about greater than 0.2 wt. %. In a preferred embodiment, the porous support material comprises a mixed Ti/Zr oxide with a molar ratio of 2:1, Ti:Zr, often called "Srilankite" in the crystalline phase.

It has surprisingly been found that catalyst support material prepared from certain soluble salt precursors of oxides of titanium and zirconium, including titanyl sulfate and zirconyl sulfate, exhibit an improved porous morphology that imparts improved catalytic activity and selectivity to the resulting catalyst after deposition of an active catalyst component on the surface of the material compared with prior art catalysts. It has also been surprisingly been found that the porous support material may be prepared from other precursors of titanium and/or zirconium oxides if the porous support is prepared in the presence of a sulfate salt. For example, in some embodiments, the inventive porous support may be prepared from titanium chloride and zirconyl sulfate or from a titanyl sulfate and zirconium chloride. In other embodiments, the porous supports may be prepared from non-sulfate precursors of zirconium and titanium dioxide in the presence of another sulfate salt. The catalysts described in the prior art are typically produced from chloride precursors in the absence of sulfates, which do not produce the porous supports described herein.

The inventive porous support material is formed by co-precipitating titanium and zirconium oxides under controlled conditions from suitable precursors of titanium and zirconium oxides. Typically, precursors of $TiO_2$ and $ZrO_2$ are mixed with a suitable medium, such as an aqueous solvent, at a pH range where the precursors will form $TiO_2$ and $ZrO_2$ and precipitate the porous $TiO_2/ZrO_2$ support material.

Suitable titanium dioxide precursors include titanium salts such as titanyl sulfate, titanium oxychloride and the like. Titanyl sulfate is a preferred titanium dioxide precursor.

Suitable zirconium oxide precursors include soluble zirconium salts such as zirconium nitrate, zirconium sulfate, zirconyl perchlorate and the like. Zirconium sulfate is a preferred zirconium oxide precursor.

Precipitation of $TiO_2$ and $ZrO_2$ from water-soluble salts may be affected by adjusting the pH of the solution to a pH where the water soluble titanium salt and water soluble zirconium salt form insoluble species which co-precipitate from solution. Typically, this is accomplished by raising the pH of the solution with addition of a base to a pH range where the titanium and zirconium salts become insoluble. The required pH range will vary based on the inherent reactivity of the precursor toward water.

Any base known in the art that will increase the pH of an aqueous solution of the water-soluble titanium salt may be used to precipitate the $TiO_2/ZrO_2$ catalyst support particles, including inorganic bases and organic bases. Suitable bases include, but are not limited to, amine bases including as ammonium hydroxide, mono-, di- or trialkylamines such as triethylamine, diisopropylethylamine and the like; cyclic amine bases such as N-ethylmorpholine, piperidine, pyrrolidine and the like; hydroxides or alkoxides of alkali metals or alkaline earth elements such as sodium, lithium, potassium hydroxide, magnesium hydroxide, calcium hydroxide; sodium, lithium or potassium alkoxides such as methoxide, ethoxide, butoxide, t-butoxide and the like; carbonate and bicarbonate bases such as sodium, lithium or potassium carbonate and bicarbonate and the like. It will be apparent to skilled persons that the type of base is not limited to the bases described above, and that there are many other bases that may be used to adjust the pH of the solution of water-soluble titanium salt.

The mixed titanium and zirconium oxides may be precipitated from suitable titanium or zirconium precursors, such as titanyl or zirconyl sulfates, chlorides or nitrates, by adjusting the pH to between about 4 to about 12. More typically, the pH is adjusted to about 5 to about 12, about 5 to about 9 or about 7 to about 9 to initiate the precipitation of the Ti/Zr oxide support material. In some embodiments, the mixed titanium/zirconium oxide material is precipitated by adjusting the pH to about 7 to about 8. In one embodiment, the catalyst support particles are precipitated by adjusting the pH to about 7.5.

In particular embodiments, the $TiO_2/ZrO_2$ porous support material is precipitated from sulfate precursors at a more acidic pH range, such as about 5 to about 7, or about 5 to about 6, resulting in the formation of smaller particle size support particles with greater porosity and larger surface areas. The inventive support material exhibits greater porosity and larger pore diameter, which is beneficial for the activity and selectivity of the catalyst.

In another embodiment, the $TiO_2$ precursor is an organotitanium compound that will react with water to form $TiO_2$. Suitable organotitanium compounds include, but are not limited to, titanium alkoxides of the general structure $Ti(OR)_4$ where each R is independently alkyl, aryl or heteroaryl; titanium acyl compounds such as titanyl acetylacetonate and the like. Preferred titanium alkoxides include titanium tetraisopropoxide, titanium tetra-n-propoxide, titanium tetraethoxide, titanium tetramethoxide, titanium tetra-n-butoxide and titanium tert-butoxide and the like. Mixed titanium alkoxides, where the R groups in $Ti(OR)_4$ may be different, are also contemplated as $TiO_2$ precursors in the present invention. Other suitable organic titanium compounds include titanium (IV) amine compounds such as tetrakis(dimethylamino)titanium, tetrakis(diethylamino)titanium and the like. The organotitanium $TiO_2$ precursor is typically hydrolyzed by introduction of a minimum amount of water which results in precipitation of $TiO_2$ particles from solution.

In still other embodiments, zirconium oxide precursors comprise organozirconium compounds that will form zirconium oxide when treated with water. Suitable organozirconium precursors include, but not limited to, zirconium alkoxides of the general structure $Zr(OR)_4$ where each R is independently alkyl, aryl or heteroaryl; zirconium acyl compounds such as zirconium acetate and zirconium acetylacetonate and the like. Preferred zirconium alkoxides include zirconium tetraisopropoxide, and zirconium tetraisopropoxide isopropanol complex, zirconium tetra-n-butoxide and zirconium tetra-tert-butoxide, zirconium tetraethoxide and the like. Mixed titanium alkoxides, where the R groups in $Zr(OR)_4$ may be different, are also contemplated as zirconium oxide precursors. Other suitable organic zirconium compounds include titanium (IV) amine compounds such as tetrakis(dimethylamino) zirconium, tetrakis(diethylamino) zirconium and the like. As with the organotitanium compounds, organozirconium species will typically react with water and precipitate from solution as the oxide. It will be apparent to persons skilled in the art that the conditions of the precipitation such as temperature, pH and amount of water will vary depending on the reactivity of the precursor.

In some embodiments, the porous support is formed by precipitating the material from precursors of oxides of titanium and zirconium, where one of the precursors is a sulfate and the other is a non-sulfate precursor.

In another embodiment, the porous support is formed from non-sulfate precursors of titanium and zirconium oxides in the presence of a sulfate salt. The amount of the sulfate present may be from about 0.1 wt. % to about 500 wt. %, measured as sulfate ion alone in the absence of a counterion, based on the total amount of zirconium and titanium oxides present in the porous support. More typically, the amount of sulfate is from about 0.1 wt. % to about 100%, from about 1% to about 50%, or from about 10% to about 50% by weight.

After precipitation of the $TiO_2/ZrO_2$ porous support particles, the solid material may be isolated by any standard means known in the art, such as by filtration, centrifugation and the like. The $TiO_2/ZrO_2$ porous support particles may be washed with an aqueous solvent to remove contaminants and byproducts of the precipitation and dried. In another embodiment, the $TiO_2/ZrO_2$ porous support particles are processed further to deposit additional components as described below prior to isolation and drying.

Crystalline Phase

The porous support material of the invention typically comprises particles that comprise a crystalline phase of $TiO_2$ and/or a mixed titanium-zirconium mixed oxide.

In one embodiment, the porous support material comprises a crystalline phase that contains anatase $TiO_2$. In another embodiment, the porous support particles comprise a crystalline phase that comprises rutile $TiO_2$. In still another embodiment, the catalyst support particles comprise a crystalline phase that comprises a mixture of anatase and rutile $TiO_2$.

Typically, the porous support material comprises a crystalline phase of a titanium-zirconium mixed oxide. In a particular embodiment of the invention, the mixed titanium-zirconium oxide has molar ratio of about 2:1, Ti to Zr, often called srilankite.

In yet another embodiment of the invention, the porous support material comprises a crystalline phase that includes a mixture of rutile $TiO_2$ and/or anatase $TiO_2$ and/or a mixed titanium-zirconium oxide.

Typically, the crystalline phase of the porous support material comprises at least about 70 mol % of a mixture of anatase $TiO_2$ and a mixed Ti/Zr oxide. In other embodiments, the crystalline phase comprises at least about 75 mol %, 80 mol % or 85 mol % of a mixture of anatase $TiO_2$ and a mixed Ti/Zr oxide. Preferably, the crystalline phase comprises at least about 90% or about 95% of a mixture of anatase $TiO_2$ and a mixed Ti/Zr mixed oxide. In other embodiments, the crystalline phase comprises about 75% to about 100 mol %, about 80% to about 90 mol % or about 85% to about 95 mol % of a mixture of anatase $TiO_2$ and a mixed Ti/Zr oxide. Preferably, the crystalline phase of the porous catalyst support material comprises about 90 mol % to about 100 mol % or about 95 mol % to about 100 mol % of a mixture of anatase $TiO_2$ and a mixed Ti/Zr oxide.

The crystalline phase of the porous support material will typically comprise less than about 20 mol % rutile $TiO_2$. In other embodiments, the crystalline phase comprises less than 5 mol % or less 1 mol % rutile $TiO_2$. In one embodiment, the support particles comprise about 0.1% to about 20 mol % rutile $TiO_2$. More typically, the crystalline phase will comprise about 0.1% to about 10 mol % or about 1% to about 10 mol % rutile $TiO_2$. Preferably, the crystalline phase will comprise about 0.1 mol % to about 5 mol % or about 1 mol % to about 5 mol % rutile $TiO_2$.

In one preferred embodiment, the crystalline phase will comprise the inner core of the porous support particles. For example, where the particles comprise a crystalline phase and an amorphous phase as described below, the center of the particles will be crystalline, while the surface regions will comprise amorphous material or a mixture of amorphous and crystalline material.

The catalyst support particles may optionally include other metals, metalloids, metal oxides or oxides of metalloids that improve the performance of the catalyst in addition to $TiO_2$, $ZrO_2$ or a mixed Ti/Zr oxide. For example, silicon compounds such as $SiO_2$ may be included with the Ti/Zr oxide material to improve the thermal stability of the porous support. Any suitable precursor of silicon oxides may be mixed with the titanium and zirconium oxide precursors to produce the desired material upon precipitation of the porous support. In other embodiments, soluble silicates may be added to the Ti/Zr oxide precursors, which will produce $SiO_2$ when the pH of the mixture is appropriately adjusted to form the porous support. In other embodiments, other precursors of $SiO_2$ may be used including, but not limited to, silyl halides, silyl alkoxides or other organo silicon compounds.

Amorphous Phase

The inventive porous support material typically also comprises an amorphous metal oxide phase in addition to the crystalline phase. In one embodiment, the amorphous metal oxide phase is present on the surface of the $TiO_2/ZrO_2$ crystalline phase. The amorphous phase may comprise titanium dioxide, zirconium dioxide and amorphous titanium/zirconium mixed oxides. As with all amorphous material, the amorphous phase does not have an ordered orientation of the metal oxide layers and does not exhibit a defined X-Ray Powder Diffraction pattern (XRD). Typically, the amorphous phase comprises a mixture of metal oxides that are randomly packed, which leads to higher porosity and surface area. The higher porosity and surface area of the amorphous surface phase improves the catalytic performance of the catalyst. Preferably, the amorphous phase comprises zirconium. In one embodiment, the amorphous phase comprises $TiO_2$, $ZrO_2$ and a Ti/Zr mixed oxide. In another embodiment, the amorphous phase may also optionally comprise other metals or metal oxides that improve the performance and/or selectivity of the catalyst.

Typically the amorphous phase comprises greater than about 50 mol % of zirconium oxide, relative to other metal oxides. In another embodiment, the amorphous phase comprises about 50 mol % to about 100 mol % zirconium oxide. In still other embodiments, the amorphous phase comprises from about 60% to about 100 mol %, from about 70% to about 100 mol %, from about 80% to about 100 mol %, from about 90% to about 100 mol %, from about 80% to about 95 mol %, or from about 85% to about 95 mol % zirconium oxide.

FIG. 1 shows the transmission electron microscopy (TEM) image of porous support material with a crystalline phase comprising anatase $TiO_2$ and an amorphous metal oxide phase on the surface of the crystalline phase. The amorphous phase is enriched in zirconium.

Figure 2:
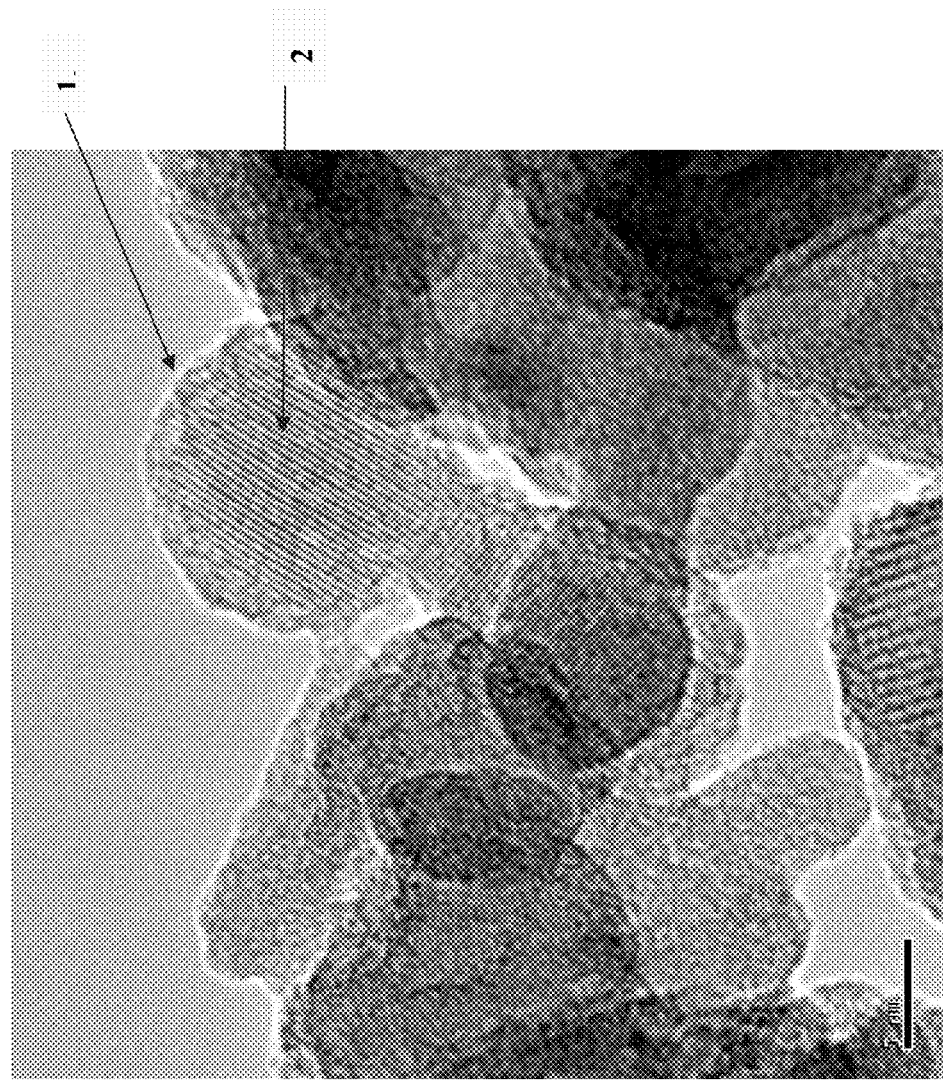
FIG. 2 shows a TEM image of the porous support material with arrow 1 pointing to a crystalline phase comprising a mixed titanium/zirconium oxide called srilankite and arrow 2 showing an amorphous phase enriched in zirconium.

FIG. 2 shows a TEM image of a catalyst support particle with a crystalline phase comprising a mixed titanium/zirconium mixed oxide called srilankite. The crystalline srilankite phase also contains an amorphous phase on the surface of the crystalline phase that is enriched zirconium.

The catalyst support particles, including a crystalline phase and an amorphous phase, typically comprise a mixture of $TiO_2$, $ZrO_2$ and a Ti/Zr mixed oxide. The ratio of Ti to Zr is varied by using different amounts of titanium oxide and zirconium oxide precursors in the preparation of the material. Typically, the molar ratio of Ti to Zr in the catalyst support particles is about 40:60 to about 95:5. In another embodiment, the molar ratio of Ti to Zr is about 60:40 to about 95:5. In various embodiments, the molar ratio of Ti:Zr is about 65:35 to about 90:10, about 65:35 to about 85:15, or about 65:35 to about 80:20. In other embodiments, the molar ratio of Ti:Zr is 70:30 to about 90:10, about 70:30 to about 85:15 or about 70:30 to about 80:20. In still other embodiments, the molar ratio of Ti:Zr is about 75:25 to about 90:10, about 80:20 to about 95:5, about 80:20 to about 90:10 or about 80:20 to about 85:15. In particular embodiments, the molar ratio of Ti:Zr in the porous support material is about 70:30, about 75:25 or about 80:20.

It has been surprisingly discovered that the porous support material of the invention prepared by the precipitation of titanium and zirconium oxides from suitable precursors in the presence of a sulfate compound, such as a sulfate salt of titanium or zirconium, are much less densely packed and have more porosity and lager pore diameter, compared to catalyst support materials from the prior art, which are typically produced from chloride precursors without a sulfate salt or other sulfate compound. Sulfate compounds may be salts that comprise a sulfate anion or neutral sulfate compounds, such as sulfate esters and the like.

In one preferred embodiment of the invention, the porous support materials are produced from sulfate precursors of titanium and zirconium oxides. The presence of sulfate directs the nano-assembly of the titanium/zirconium oxide particles to increase the pore size distribution of the material. The inventive support material of the present invention produced from titanium and zirconium sulfate precursors is much less densely packed compared with support materials described in the prior art.

Figure 3:
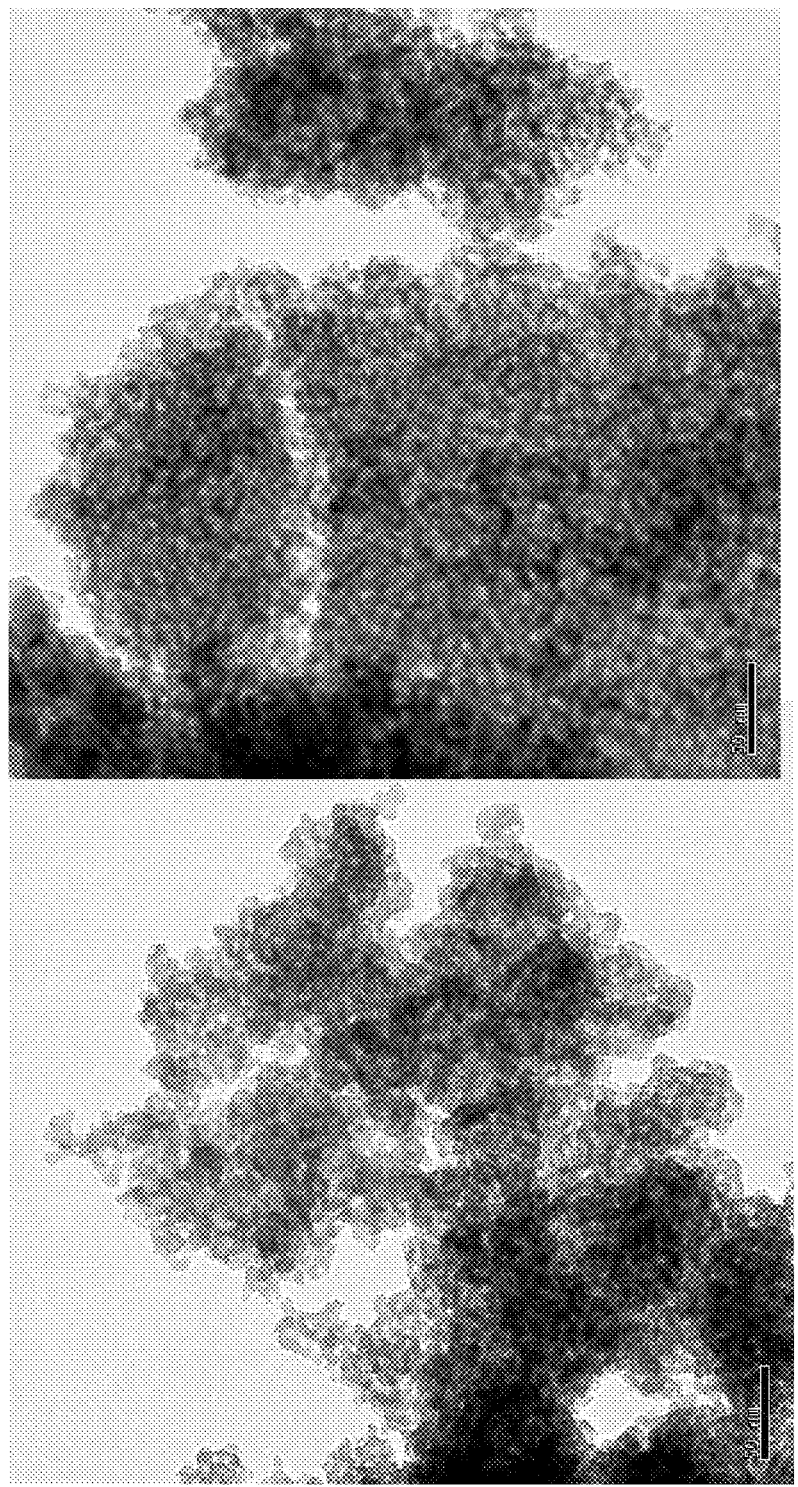
FIG. 3 shows TEM images of two support materials. The left panel shows the porous support of the invention, which is produced from titanium and zirconium sulfate precursors, and the right panel shows support material produced by the prior art process described in U.S. Pat. No. 4,221,768 from chloride precursors.

FIG. 3 shows transmission electron micrographs (TEM) of porous support materials produced from titanyl sulfate and zirconyl sulfate compared with support material produced according to the prior art method described in U.S. Pat. No. 4,221,768 ('768 patent) prepared from chloride precursors. As the figure shows, the support material of the invention is comprised of particles that are less densely packed, resulting in more porosity and larger pore diameters.

Figure 4:
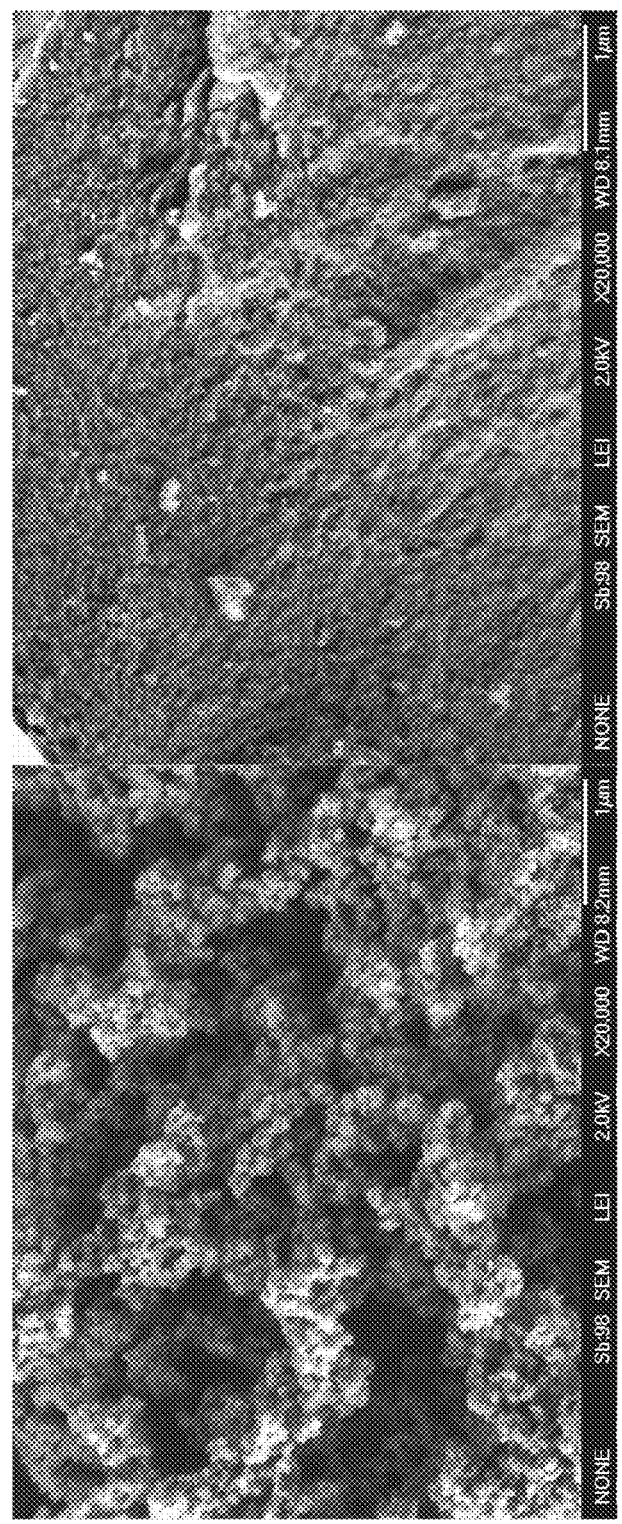
FIG. 4 shows scanning electron microscopy (SEM) images of support material. The left panel shows the porous support of the invention produced from titanium and zirconium sulfate precursors, and the right panel shows support material produced by the prior art process described in U.S. Pat. No. 4,221,768 from chloride precursors.

FIG. 4 presents scanning electron micrographs (SEM) of the porous support material of the invention compared with support material produced from the prior art process ('768 patent). The SEM image clearly shows the porous nature of the material of the invention and the larger pore diameter compared with the more densely packed prior art material.

The porous nature of the inventive support material is important to the improved catalytic activity of catalysts comprising the material. Although not being bound by theory, the porous support material with greater porosity and larger pore diameters would be expected to allow improved diffusion of vapor phase molecules to active sites. SCR catalysts comprising the support materials of the present invention exhibit surprisingly improved conversion of starting materials to products and improved ammonia selectivity. Furthermore, SCR catalysts that comprise the support material of the invention reduce the amount of the undesirable $N_2O$ by-product, particularly at higher temperature.

Figure 5:
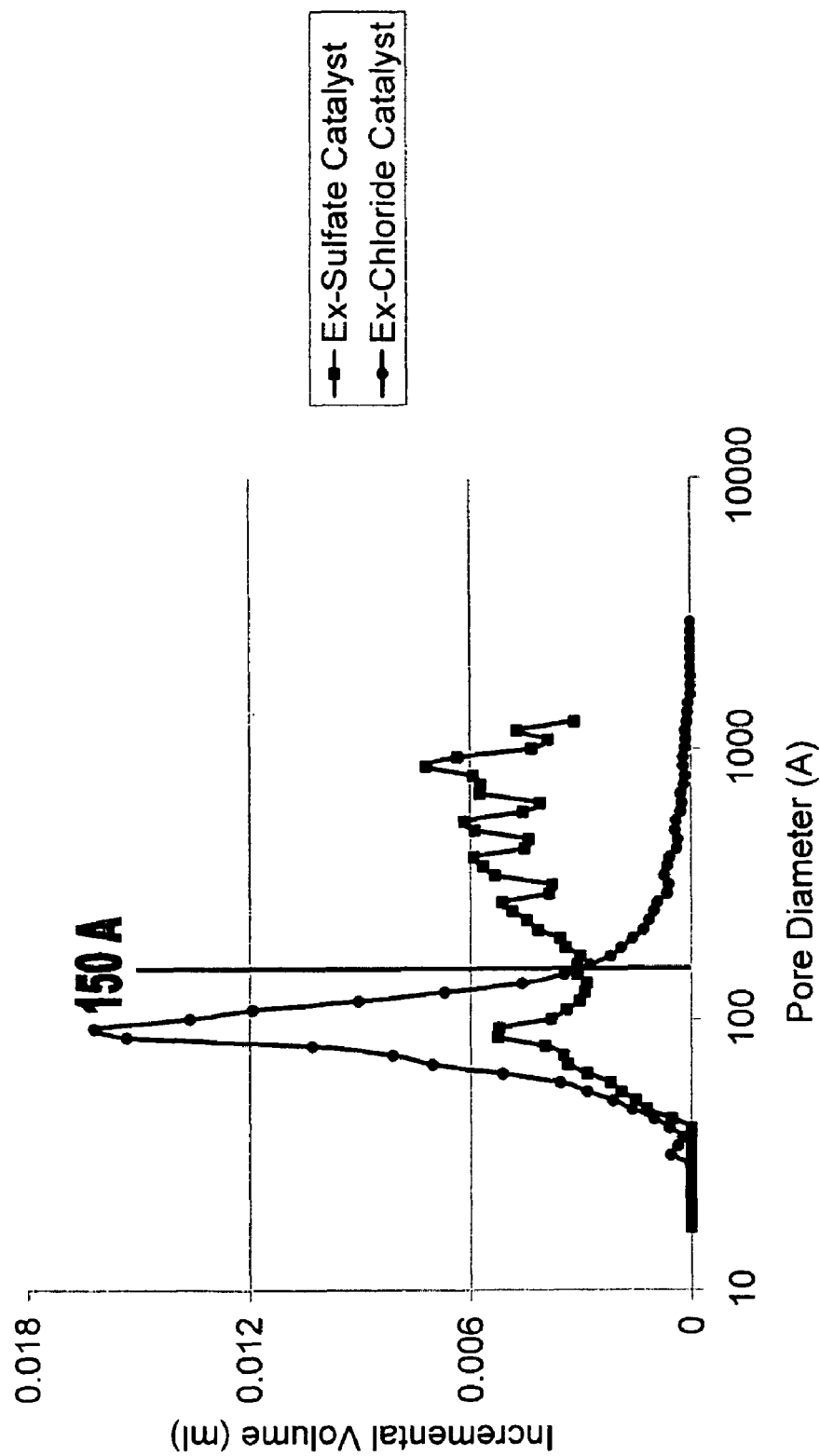
FIG. 5 shows the catalyst pore volume distribution of a catalyst support of the invention compared with a support material described in U.S. Pat. No. 4,221,768 calculated from the nitrogen adsorption isotherms.

The morphology of the porous support materials may be quantified by nitrogen adsorption. FIG. 5 shows the pore volume distribution derived from nitrogen adsorption isotherms of the support material of the invention compared with material produced by the prior art process described in the '768 patent. The inventive porous support contains a significantly greater proportion of pores with diameters greater than 150 angstroms, while the prior art material predominantly exhibits pore volumes with diameters less than 150 angstroms. Integration of the plots shown in FIG. 5 shows that 72% of the pore volume of the inventive support material is comprised of pores with diameters between 150 angstroms and 1270 angstroms, compared with only 14% of the pore volume of the prior art material. This significant difference in the morphology of the support material results in improved catalytic performance of catalysts comprising the porous support material.

Surface Metal Oxide Deposition

It has been surprisingly found that deposition of a small amount of one or more other metal oxide(s) or metalloid oxide(s) (for example, oxides of boron, silicon, aluminum, germanium, arsenic, antimony, tellurium, or polonium) on the amorphous surface layer of the pre-formed mixed $TiO_2$/$ZrO_2$ porous support material prior to introduction of the active catalyst component significantly improves the performance of the catalyst in SCR applications. The small amount of metal oxide(s) or metalloid oxide(s) is deposited on the catalyst support particles by methods known in the art, such as by impregnation by contacting the porous support material with a solution or suspension comprising a metal oxide or metal oxide precursor. Various metal oxides or metalloid oxides may be used for this purpose including, but not limited to, an oxide of titanium, aluminum, silicon, boron and the like, and mixtures thereof.

In some embodiments, the small amount of metal oxide(s) or metalloid oxide(s) on the surface may be catalytically active in the reduction of NOx compounds. In other embodiments, the metal oxide(s) or metalloid oxide(s) are not substantially catalytically active in the reduction of NOx compounds, but modify the surface of the porous support to increase the catalytic activity of a composition comprising a porous support and an active metal component. Typically, the metal oxide(s) or metalloid oxide(s) deposited on the surface of the porous support modify the surface of the support but are not typically substantially catalytically active by themselves as DeNOx catalysts compared to the active component. For example, the metal oxide(s) or metalloid oxide(s) deposited on the porous support will typically be less than about 25% as active as the active component in the reduction of NOx compounds when present at the same concentration on the porous support.

Any precursors of metal oxides described that are able to deposit the metal oxide on the surface of the catalyst support particles may be used. Similar precursors may be utilized to deposit oxides of metalloids on the surface of the support. For example, when the metal oxide is $TiO_2$ or $ZrO_2$, the $TiO_2$ and $ZrO_2$ precursors described above for the formation of the mixed $TiO_2/ZrO_2$ porous support material may be used. In some embodiments, $TiO_2$ and $ZrO_2$ precursors include titanium or zirconium salts and titanium and zirconium halides including, but not limited to, titanium or zirconium oxychloride, titanium chloride, zirconium chloride, titanyl sulfate, titanium oxynitrate, zirconium sulfate, zirconium nitrate and the like may be used. Oganotitanium and organozirconium precursors are also suitable. In some embodiments, mixtures of metal oxide and/or metalloid oxide precursors may be used.

In one preferred embodiment, titanium dioxide is deposited on the surface of the porous support material. Titanium dioxide is acidic in character and addition of a small amount of $TiO_2$ to the surface of the porous support particles improves the performance of SCR catalysts comprising the porous support. The titanium dioxide may be anatase, rutile, or amorphous or may be mixtures of any two of the three or all three phases of $TiO_2$. Preferably, the titanium dioxide is in the anatase form. Other metal oxides with acidic character may also improve the performance of the catalyst.

In other embodiments, oxides of aluminum or boron may be deposited on the surface of the porous support.

In some embodiments, an amount of one or more metal oxide(s) or metalloid oxide(s) and/or precursors of one or more metal oxide(s) or metalloid oxide(s) are added to deposit about 0.1% to about 5% of metal oxide(s) and/or metalloid oxide(s) (by wt. of porous support) on the surface of the porous support prior to introduction of the active catalyst component. In other embodiments, an amount of one or more metal oxide(s) or metal oxide precursor(s) or metalloid oxide(s) or metalloid oxide precursor(s) is added to deposit about 0.1% to about 3%, or about 0.1% to about 2% metal oxide(s) and/or metalloid oxide(s) by weight on the porous support. In still other embodiments, about 0.2% to about 5%, about 0.2% to about 3%, or about 0.2% to about 2% of metal oxide(s) or metalloid oxide(s) by weight is deposited on the porous support. Preferably, about 0.5% to about 3% or about 0.5% to about 2% metal oxide(s) and/or metalloid oxide(s) by weight is deposited on the porous support material.

After deposition of a small amount of one or more metal oxide(s) or metalloid oxide(s) on the surface of the $TiO_2/ZrO_2$ porous support, the porous support material is typically isolated by filtration or other isolation methods and washed with water to remove spectator ions that are loosely associated with the solid support particles. Any suitable method of solid filtration/isolation may be used to isolate and wash the solid support particles. For example, the particles may be conveniently isolated by filtration and washed on a filter. In other embodiments, the solid particles are isolated by centrifugation or other means. In one embodiment, the conductivity of the spent wash liquors is monitored to ensure that the solid support particles are sufficiently free of spectator ions. Typically, the support material will be washed sufficiently free of spectator ions so that the wash liquors have a conductivity of less than 200 millisiemens per centimeter (mS/cm). More typically, the support material is washed until the conductivity of the wash liquors is less than 150 mS/cm or 100 mS/cm. Preferably, porous support material will be washed sufficiently free of spectator ions so that the wash liquors will have a conductivity less than 50 mS/cm.

The porous support material may be isolated and dried prior to deposition of the active catalyst component. Preferably, greater than 90% or 95% by weight of the solvent or dispersion medium is removed. More preferably, greater than 98% of the medium is removed. When water is the dispersion medium, a suitable drying temperature is about 80° C. to about 120° C. However, it will be apparent to one of skill in the art that lower or higher drying temperatures may be used. For example, drying temperatures of less than 80° C. may be used if the drying time is increased or the drying pressure is decreased. A preferred drying temperature is about 100° C. Usually, the catalyst is dried for at least 10 hours at 100° C. to ensure that the solvent is adequately removed. More typically, the catalyst is dried for at least 12, 14 or 16 hours at 100° C. to ensure that the solvent is removed to a sufficient level.

The SCR catalysts comprising the inventive porous support material of the invention are formed by depositing an active catalyst component on the surface of the porous support material. In preferred embodiments of the invention, the SCR catalysts comprising the porous support material contain substantially no vanadium, meaning that the catalyst contains no measurable amount of vanadium or only low amounts of vanadium that do not significantly affect the catalytic activity of the catalyst.

The active metal catalyst component is deposited on the surface of the support particles by treating a slurry of the porous support in a suitable dispersion medium, such as water or an aqueous solvent, with a precursor of the active metal catalyst and aging the mixture to allow the catalyst component to adsorb on the porous support material. Various active catalyst components may be deposited on the inventive porous support material, including but not limited to, oxides of vanadium, tungsten, molybdenum, tin, chromium, lanthanum, manganese, neodymium, cerium, iron, or mixtures thereof. In other embodiments, the active catalyst component may be cobalt, molybdenum, nickel, or an oxide of these metals, or mixtures thereof. Preferably, the active catalyst component comprises manganese, preferably an oxide of manganese. In another preferred embodiment, the active catalyst component comprises iron or an oxide of iron. In still another preferred embodiment, a mixture of active catalysts components are deposited on the porous support. In a third preferred embodiment cerium or an oxide of cerium serves as the active component. For example, in one embodiment, a precursor of oxides of iron and manganese are deposited on the porous support material.

In some preferred embodiments, the manganese oxide catalyst may be a Mn (IV) or Mn (II) oxide. In some embodiments, the active manganese oxide catalyst material is deposited by treating the catalyst support particles with a soluble manganese salt, which is a manganese oxide precursor. In some embodiments, the manganese precursor is manganese (II) acetate, manganese (III) acetate, manganese (II) acetylacetonate, manganese (III) acetylacetonate, manganese (II) bromide, manganese (III) bromide, manganese (II) carbonate, manganese (II) chloride, manganese (III) chloride, manganese (II) fluoride, manganese (III) fluoride, manganese (II) iodide, manganese (III) iodide, manganese (II) cyclohexanebutyrate, manganese (II) hexafluoroacetylacetonate, manganese (II) nitrate, manganese (II) perchlorate, manganese (II) sulfate, and the like. In other embodiments, the manganese precursor is an organomanganese compound, such as bis(pentamethylcyclopentadienyl)manganese and the like.

In another preferred embodiment, the active catalyst component may comprise iron or an oxide of iron. In some embodiments, the iron active component may be deposited on the porous support by contacting the support with a soluble iron salt, including but not limited to, iron (III) sulfate, ammonium iron (III) sulfate, ammonium iron (III) citrate, ammonium iron (III) oxalate, iron (III) oxalate, iron (III) acetylacetonate, iron (III) nitrate, ammonium (II) sulfate, iron (II) oxalate, iron (II) acetate, iron (II) chloride, iron (III) chloride and the like.

In a third preferred embodiment, the active catalyst component may comprise cerium or an oxide of cerium. In some embodiments, the cerium active component may be deposited on the porous support by contacting the support with a soluble cerium salt including, but not limited to ammonium cerium nitrate, ammonium cerium sulfate, cerium sulfate, cerium acetate, cerium acetylacetonate, cerium halides such as bromide, chloride, fluoride or iodide, cerium carbonate, cerium perchlorate, cerium trifluoromethanesulfonate, and the like.

In certain embodiments, a mixture of the porous support material and the active catalyst precursor is heated and aged for a sufficient period of time to promote the deposition of the catalyst component on the support particles. In another embodiment, the active catalyst component is deposited on the catalyst support particles by forming a mixture of the porous support material with a soluble active catalyst component precursor in a suitable medium, such as an aqueous solvent, and adjusting the pH of the mixture to a pH range where the active catalyst precursor is deposited on the porous support. Typically, a suitable pH range is from about 4 to about 12. More typically, the pH range is about 5 to about 9 or about 6 to about 9. Preferably, the pH is adjusted to about 7 to about 9. Any acid or base used in the art to adjust the pH of an aqueous solvent may be used, including the bases described above for adjusting the pH of solutions of water soluble $TiO_2$ and $ZrO_2$ precursors for preparation of the porous Ti/Zr support material. The bases or acids used to adjust the pH of the mixture are not limited. Common mineral acids such as sulfuric acid, hydrochloric acid, nitric acid and the like may be used. Organic acids such as carboxylic acids, sulfonic acids and the like may also be used. Bases include but are not limited to hydroxides and alkoxides of alkali metals or alkaline earth elements or amine bases, including ammonia or organic amines. In one embodiment, ammonium hydroxide is used to adjust the pH of the mixture of the active catalyst precursor and the porous support material.

It has been surprisingly been found that addition of a bicarbonate or carbonate salt to the mixture of the porous support and the active metal catalyst precursor during the deposition process enhances the deposition of the active metal catalyst on the support particles, maximizing the amount of active metal catalyst component deposited on the support particles. The bicarbonate or carbonate salt may be any readily available bicarbonate or carbonate salt including sodium bicarbonate or carbonate, potassium bicarbonate carbonate, ammonium bicarbonate or carbonate and the like. Typically, about 0.1 grams to about 10 grams of bicarbonate or carbonate salt (as ammonium carbonate) per gram of product is used. More typically, about 0.1 g to about 5 grams or about 0.1 gram to 1 gram of bicarbonate or carbonate salt per gram of product is used in the process. Preferably, about 0.5 grams to about 2 grams of bicarbonate or carbonate salt per gram of product is used.

In some embodiments, the mixture of the catalyst support particles and the active metal catalyst precursor is heated and aged for a sufficient time to aid adsorption of the active catalyst component on the support particles. In other embodiments, the mixture is aged at room temperature. Typically, the mixture is aged at a temperature of about 20° C. to about 100° C. In another embodiment, the mixture of the support particles and the catalyst component precursor are aged at a temperature of about 40° C. to about 80° C. In still another embodiment, the mixture is aged at a temperature of about 50° C. to about 70° C. The aging period is not critical as long as it is sufficient to allow enough active metal catalyst component to be deposited on the support particles. In some embodiments, the mixture is aged for at least about 5 or 10 minutes. More typically, the mixture is aged for at least 20 minutes, 30 minutes, 40 minutes, 50 minutes or 60 minutes at the desired temperature. Longer aging periods are not detrimental to the inventive catalysts.

In one preferred embodiment, a mixture of a manganese oxide precursor, such as manganese (II) sulfate tetrahydrate [Mn(II)(SO$_4$)*4H$_2$O], and the TiO$_2$/ZrO$_2$ porous support material is aged at the aforementioned temperatures to deposit sufficient manganese oxide precursor on the inventive catalyst support.

In another preferred embodiment, a mixture of a manganese oxide precursor, such as manganese (II) sulfate tetrahydrate [Mn(II)(SO$_4$)*4H$_2$O], and the porous support material is aged at a pH of about 7-9 to deposit sufficient manganese oxide precursor on the porous support upon drying and calcination.

In still another preferred embodiment, a mixture of a manganese oxide precursor, such as manganese (II) sulfate tetrahydrate [Mn(II)(SO$_4$)*4H$_2$O], and an iron oxide precursor, such as iron (III) sulfate [Fe$_2$(SO$_4$)$_3$*6H$_2$O], and the porous support material is aged at a pH of about 7-9 to deposit sufficient manganese oxide precursor and iron oxide precursor on the porous support.

Typically, the SCR catalysts comprise about 0.1% to about 20% active metal catalyst component by weight of the supported catalyst. In one embodiment, the catalyst comprises about 0.1% to about 10% active metal catalyst component by weight of the supported catalyst. In another embodiment, the catalyst comprise about 1% to about 10% or about 1% to about 5% active catalyst component by weight. In still another embodiment, the supported catalyst comprises about 5% to about 10% active metal catalyst component. In a particular embodiment, the supported catalyst comprises about 6% active metal catalyst component by weight of the supported catalyst.

As discussed above, the SCR catalysts of the invention preferably contain substantially no vanadium, which is desirable for various applications, including mobile SCR applications due to the toxicity and relative volatility of vanadium compounds.

After depositing the active catalyst component on the porous support, the particles are isolated by any suitable means, such as filtration, and dried for a sufficient time to remove the dispersion medium/solvent. Preferably, greater than 90% or 95% of the dispersion medium is removed. More preferably, greater than 98% of the medium is removed. The temperature at which the material is dried is dependent on the solvent medium and the pressure. Typically, the same drying temperatures and times described above for drying the porous support will be useful for drying the supported catalyst after the active metal catalyst component has been deposited. The moisture level of the dried supported catalyst can be measured by standard methods known in the art to determine if the material has been dried for a sufficient amount of time at the particular temperature. In one preferred embodiment, the supported catalyst is dried at about 100° C.

The dried catalyst is then typically calcined. In some embodiments, the catalyst is calcined at a temperature of between about 300° to about 1000° C. for about 2 to about 10 hours. More typically, the catalyst is calcined at a temperature of about 400° C. to about 800° C. or about 400° C. to about 700° C. In other embodiments, the catalyst is calcined at about 500° C. to about 700° C. for 2 to 10 hours. In still another embodiment, the catalyst is calcined at about 600° C. for about 4 to 8 hours. Preferably, the catalyst is calcined at about 600° C. for about 6 hours. The resulting catalyst exhibits improved activity in the selective catalytic reduction of NOx species.

The catalytic compositions of the invention are useful for the reduction of NOx compounds in a liquid or a gas. Accordingly, the present invention provides a method for the reduction of NOx compounds in a liquid or gas comprising contacting the liquid or gas with a catalytic composition of the invention for a sufficient time to reduce the level of NOx compounds. A sufficient time to reduce the level of NOx compounds may be instantaneous upon contact or may be within 10 minutes, 30 minutes, 1 hour, 2 hours, 3 hours, 4 hours, 8 hours or 24 hours. In particular embodiments, the time sufficient to reduce the level of NOx compounds may be the residence time of the gas or liquid in a reactor designed for reducing NOx compounds, including a fixed bed reactor. In other embodiments, the time sufficient to reduce NOx compounds may be the residence time of the gas or liquid in a mobile DeNOx reactor or device. The level of NOx compounds may be measured by any standard method known in the art, including by the method described in the examples below.

In a preferred embodiment, the catalyst support of the invention is formed from soluble sulfate precursors of titanium and zirconium oxide or wherein at least one of the precursors is a sulfate precursor. The porous support material is produced by adjusting the pH of a mixture so that oxides of titanium and zirconium are caused to precipitate. The ratio of titanium to zirconium can be varied. A preferred ratio is 70:30, Ti to Zr (molar).

The particles of the porous material typically have a crystalline core comprised chiefly of anatase $TiO_2$ or a mixed titanium/zirconium oxide called "srilankite," where the molar ratio of Ti/Zr is about 2:1. The porous support may also have a minor amount, typically less than 25 mole %, of rutile $TiO_2$ and some amount of residual sulfate (typically $\geq 0.2\%$ by weight). In addition, the crystalline core is typically covered by an amorphous phase, which is enriched in zirconium. A small amount (typically about 1-2% by weight of the support) of a metal oxide or metalloid oxide is deposited on the porous support prior to the active metal or metal oxide component. Typically, the small amount of metal oxide or metalloid oxide is not substantially catalytically active when compared to the active component.

The catalytic composition is produced by depositing an active metal or metal oxide component on the porous support. In a preferred embodiment, the composition comprises substantially no vanadium. Preferred active components include, but are not limited to, oxides of manganese, cerium and iron. Active components may also be a mixture of different metal oxides.

EXAMPLES

The following examples are presented to aid in an understanding of the present invention and are not intended to, and should not be construed to, limit the invention in any way. All alternatives, modifications and equivalents that may become obvious to those of ordinary skill in the art upon a reading of the present disclosure are included within the spirit and scope of the invention.

Example 1

Precipitation of $TiO_2/ZrO_2$ Porous Support

A first solution comprising titanyl sulfate and zirconyl sulfate is prepared by mixing 1281 grams of a $TiOSO_4$ solution (10.1 wt. % as $TiO_2$) with 1143.2 grams of a $ZrOSO_4$ solution (7.5 wt. % as $ZrO_2$) in a 2 liter vessel for 10 minutes. A second solution is prepared by diluting 6.4 mL of a tetramethylammonium silicate solution (16% w/v) to a volume of 940 mL with water. Co-precipitation is carried out by adding the first solution at a rate of 20 mL/min. and the second solution at a rate of 10 mL/min. to a continuously stirred tank reactor while simultaneously adding concentrated ammonium hydroxide to maintain the pH at 6.0. The mixing vessel is stirred at 450 revolutions per minute (rpm) using a standard mixer until precipitation is initiated and the viscosity increases. Once precipitation begins, the mixing rate is increased to 550 rpm. Product formed during the early states of mixing is discarded. After steady state is established, the product effluent is collected in a separate vessel that is also stirred continuously.

After the first solution is depleted, the pH of the collected product is optionally reduced to 5 using titanyl sulfate in order to selectively deposit 1-2 w % $TiO_2$ at the surface of the mixed metal oxide. In either case the material is then aged for 25 minutes and filtered. The filter cake is then re-slurried in a solution of 200 g ammonium carbonate in 1 liter of water and then filtered. The filter cake is washed a second time with 1 liter of deionized water and filtered again. The resulting filter cake is dried in an oven for 16 hours at 100° C. to provide the porous support material.

The material is then isolated by filtration and washed with water to remove spectator ions as determined by a conductivity measurement of the spent wash liquors of less than or equal to 1 mS/cm.

Comparative Example 1

Support Material from Chloride Precursors

Support material was produced from titanium and zirconium chloride precursors according to the procedure described in U.S. Pat. No. 4,221,768 ('768 patent) to Inoue et al. A solution is prepared by combining 410.5 g of aqueous $TiCl_4$ solution (5.7 w % $TiO_2$), 3 g of 40 w % colloidal $SiO_2$ (Trade Name Ludox 40 from Grace Davison) and 54.32 g $ZrOCl_2 \cdot 8H_2O$. The pH is then adjusted to 7.0 by slowly adding ammonium hydroxide. The slurry is then mixed for 2 hrs and filtered.

The solid is re-slurried in 250 mL of water and filtered. The cake is again washed and filtered. The cake is then dried in an oven at 100° C. for 16 hours.

Transmission Electron Microscopy (TEM)

Powders were calcined at 600° C. prior to analysis. The samples were further prepared for TEM analysis by dipping holey carbon coated Cu TEM grids directly into the provided powder. The grids were then viewed in the TEM at magnifications ranging from 15,000 to 400,000×. Analysis was performed using a JEOL 2000FX II TEM operated at 200 kV. During the imaging process particular attention was given to characterizing particle morphology and phase distribution. Images were collected with a Gatan MultiScan CCD camera.

X-ray diffraction (XRD) analysis of the porous support produced by the process described in Example 1 show that the crystalline phase of the material is a combination of anatase titanium dioxide, a Ti/Zr mixed oxide with a ratio of Ti to Zr of 2:1, identified as srilankite, with a minority of rutile titanium dioxide, typically <25 mole % and more typically less than 10 mole % or 5 mole %.

FIGS. 1 and 2 show TEM images of the porous support of the invention. FIG. 1 shows a crystalline phase of anatase $TiO_2$ coated with an amorphous phase that is rich in zirconium. FIG. 2 shows a mixed titanium/zirconium oxide crystalline srilankite phase with a zirconium-rich amorphous phase on the surface of the crystalline phase.

FIG. 3 shows TEM images at the same magnification of the porous support material of the invention produced from sulfate precursors prepared according to Example 1 on the left panel, compared with Ti/Zr support material of the prior art prepared according to the '768 patent (Comparative Example 1) on the right panel. As the figure shows, the porous support material of the invention is much less densely packed than the prior art support material. The less dense packing of the support material of the invention is expected to allow improved diffusion of vapor phase molecules to the active site and improve conversion, selectivity, and lower the formation of $N_2O$ by-product, particularly at higher temperatures.

Scanning Electron Microscopy (SEM)

Powders were calcined at 600° C. prior to analysis. The samples were then prepared for SEM analysis by gently grinding the provided powder to generate fresh fracture surfaces and then dispersing the resulting material onto Al SEM stubs covered in colloidal graphitic carbon. Care was taken during analysis to only image fracture surfaces representative of the internal structure of the provided material. SEM analysis was conducted using a JEOL 7401 at 2 kV without conductive coating.

FIG. 4 shows SEM images of the porous support of the invention compared with support material of the prior art prepared according to the '768 patent (Comparative Example 1). The image in the left panel is produced from sulfate precursors according to Example 1, and the image in the right panel is the prior art support prepared according to Comparative Example 1 from chloride precursors. The figure clearly shows that the porous support of the invention has more pores with larger pore size, which results in improved catalytic activity and selectivity. The difference in pore size distribution is quantified by nitrogen adsorption.

Nitrogen Adsorption Pore Size Distribution

Surface areas and total pore volumes are measured via nitrogen adsorption at liquid nitrogen temperature using Micromeretics Tri-Star automated adsorption equipment. Samples are calcined at 600° C. for 6 hrs and then degassed at 150° C. for 16 hrs prior to analysis. The pore size distributions are calculated from a 72 point isotherm using Micromeretics software, "DFTPlus" which fits the experimental isotherm with a linear combination of theoretical isotherms generated from density functional calculations.

FIG. 5 shows a plot of catalyst pore volume distribution of the support material of the invention (Example 1) compared with the prior art support material (Comparative Example 1) obtained from the nitrogen adsorption isotherm. The plot shows that the porous support of the invention prepared from sulfate precursors has greater porosity with a width of greater than 150 angstroms compared with the prior art material. Integration of each chart shows that 72% of the pore volume of the inventive porous support is comprised of pores with diameters between 150 and 1270 angstroms, whereas only 14% of the porosity of the prior art support material falls within this pore size range.

Example 2

Catalyst Preparation and Hydrothermal Treatment

A solution of iron and manganese salts was prepared by dissolving 0.68 gram of iron (III) sulfate $[Fe_2(SO_4)_3*6H_2O]$ and 0.16 gram of manganese (II) sulfate tetrahydrate $[Mn(II)(SO_4)*4H_2O]$ into 20 ml water. The iron and manganese solution was added to the support prepared in Example 1 which was suspended in 20 ml water using agitation and a second vessel and allowed to mix for 15 min. The pH was then adjusted to 8.0 by slowly adding dilute ammonium hydroxide. Finally 0.37 g of ammonium bicarbonate was added to the slurry. At the end of 30 minutes of mixing the mixture was filtered and dried for 6 hrs at 100° C. followed by 6 hrs calcination at 600° C.

Samples of the catalyst are treated under hydrothermal conditions by exposing them to a flow of nitrogen saturated with 10% water vapor at 750° C. for 16 hours.

Example 3

Deposition of 6% Mn on $TiO_2/ZrO_2$ Porous Support

Ten grams of a $TiO_2/ZrO_2$ catalyst support particles comprising a molar ratio of 80:20, Ti to Zr are mixed with 20 mL of water in a beaker. The temperature of the mixture is maintained at room temperature and the pH is recorded. In a separate vessel, 2.5 grams of manganese sulfate tetrahydrate $[Mn(II)(SO_4)*4H_2O]$ are dissolved into 20 mL of water. The manganese solution is added to the slurry of the $TiO_2/ZrO_2$ support particles and the mixture is aged for 15 minutes. The pH of the mixture is measured and dilute ammonium hydroxide (concentrated ammonium hydroxide diluted in 4 parts of water) is added dropwise to adjust the pH of the mixture to 8. After adjusting the pH, 0.75 grams of ammonium bicarbonate are added to the slurry and the pH is adjusted to 8. The resulting mixture is aged for 30 minutes with mixing. At the end of the aging period, the solid is isolated by filtration and washed with water. The supported catalyst is dried at 100° C. for 6 hours and calcined at 600° C. for 6 hours.

Example 3

Catalytic Activity of Inventive Catalysts

Percent NOx conversion is calculated in the following manner:

$$\text{Conversion} = 100\% \times [1 - \{(NO+NO_2)_o/(NO+NO_2)_i\}]$$

Where:

$(NO+NO_2)_i$=The total concentration of NO and $NO_2$ at the inlet of the reactor $(NO+NO_2)_o$=The concentrations of NO and $NO_2$ at the outlet of the reactor Percent $NH_3$ selectivity is calculated in the following manner:

$$\text{Selectivity} = 100\% \times [\{(NO+NO_2)_i - (NO+NO_2)_o\}/(NH_{3\,i} + NH_{3\,o})]$$

Where:

$NH_{3\,i}$=The concentration of ammonia at the inlet of the reactor $NH_{3\ o}$ = The concentration of ammonia at the outlet of the reactor Catalysts of the invention comprising approximately 6% Mn by weight on the inventive $TiO_2/ZrO_2$ porous support material were evaluated for activity in the catalytic reduction of NO. Several catalysts prepared in the manner described in Example 1, with $TiO_2/ZrO_2$ support particles with varying molar ratios of Ti to Zr, both with and without deposition of titanium on the mixed $TiO_2/ZrO_2$ support. The catalysts were tested in the powder form without further shaping. A ⅜" quartz reactor which holds 0.1 grams of catalyst supported on glass wool was utilized to test the activity of the catalyst.

Table 1 below presents the % conversion of NO and the rate of the reduction at 250° C. and 350° C. for catalysts comprising 6% Mn deposited on $TiO_2/ZrO_2$ porous supports with Ti:Zr molar ratios of 70:30, 75:25 and 80:20. The conversion is monitored by measuring the concentration of NO using FTIR. The performance of the catalysts is compared with a 1.8% vanadium catalyst, which is currently state of the art.

Reactor Testing Procedure

NOx conversion is determined using catalyst powders in a fixed bed reactor. The composition of the reactor feed is 500 ppm NO, 500 ppm $NH_3$, 10 vol. % $O_2$, 5.5 vol. % $H_2O$, and balance $N_2$. Gas hourly space velocity (GHSV) is 300 l/hr-g catalyst. Catalyst performance is measured at 250° C. and 350° C. The measurements are made by first establishing steady state while passing the effluent stream through the reactor to determine the catalyst performance, and then bypassing the reactor to determine concentration measurements in the absence of reaction. Conversion is determined by the relative difference.

is greatest at the base composition of 75:25 TiO2/ZrO2. The overall best performance at low temperature is best for the catalyst support composition of 70:30 $TiO_2/ZrO_2$. As the table shows, all of the inventive catalysts that comprise a catalyst support with 1% titanium deposited on the catalyst support exhibit superior low temperature conversion compared with the vanadia catalyst. Furthermore, Catalysts with a Ti/Zr molar ratio of 70:30 or 80:20, Ti:Zr, show equivalent activity at 250° C. compared to the vanadia catalyst.

At the higher temperature of 350° C., the catalysts with catalyst support material with a Ti/Zr molar ratio of 70:30 or 80:20, Ti:Zr, both with and without 1% titanium deposited on the surface, approach the activity of the vanadia catalyst.

Table 2 below shows the performance of several catalysts of the invention prepared according to Example 2 comprising an active catalyst component comprising 1.5 wt. % iron and 0.4% manganese deposited on porous supports of the invention prepared from sulfate precursors compared with the catalytic performance of a prior art catalyst comprising a support prepared according the procedure in Comparative Example 1.

Reactor Testing Procedure

NOx conversion is determined using catalyst powders in a fixed bed reactor. The composition of the reactor feed is 340 ppm NO, 170 ppm $NO_2$, 500 ppm $NH_3$, 10 vol. % $O_2$, 5.5 vol. % $H_2O$, and balance $N_2$. Gas hourly space velocity (GHSV) is 102 l/hr-g catalyst. Catalyst performance is measured at 200° C., 350° C. and 500° C. The measurements are made by first establishing steady state while passing the effluent stream through the reactor to determine the catalyst performance, and then bypassing the reactor to determine concen-

TABLE 1

Catalytic Activity of Mn Catalysts

| | 250° C. | | 350° C. | |
|---|---|---|---|---|
| Catalyst Composition | NO Conversion (%) | NO Rate (/s) | NO Conversion (%) | NO Rate (/s) |
| 1.8% V2O5/DT52 (control) | 26.4 | 0.3 | 67.2 | 1.1 |
| 6% Mn on 70:30 Ti:Zr | 26.3 | 0.305 | 49.0 | 0.674 |
| 6% Mn on 70:30 Ti:Zr + 1% Ti | 45.7 | 0.611 | 60.8 | 0.938 |
| 6% Mn on 70:30 Ti:Zr + 2% Ti | 3.6 | 0.037 | 4.9 | 0.050 |
| 6% Mn on 75:25 Ti:Zr | 11.0 | 0.116 | 20.8 | 0.233 |
| 6% Mn on 75:25 Ti:Zr + 1% Ti | 35.8 | 0.443 | 51.6 | 0.726 |
| 6% Mn on 80:20 Ti:Zr | 30.7 | 0.366 | 58.3 | 0.874 |
| 6% Mn on 80:20 Ti:Zr + 1% Ti | 29.7 | 0.352 | 51.7 | 0.727 |

Based on the results shown in Table 1, the degree of improvement in low temperature conversion (250° C.) of NO tration measurements in the absence of reaction. Conversion is determined by the relative difference.

TABLE 2

| | | | | | 200 C. | | 350 C. | | 500 C. | | |
|---|---|---|---|---|---|---|---|---|---|---|---|
| Performance of 1.5 w % Fe & 0.4% Mn on TiZr supports | | | | | | | | | | | $N_2O$ |
| Catalyst Number | Ti & Zr Precursors | $TiO_2$ (mol %) | $ZrO_2$ (mol %) | $SiO_2$ (mol %) | NOx Conversion (%) | $NH_3$ Selectivity (%) | NOx Conversion (%) | $NH_3$ Selectivity (%) | NOx Conversion (%) | $NH_3$ Selectivity (%) | Formation at 500 C. (ppm) |
| 6335-3-750 | Sulfates | 66 | 29 | 5 | 69.1 | 100 | 81.9 | 100 | 69.0 | 89.9 | 8.3 |
| 6335-8-750 | Sulfates | 66 | 29 | 5 | 72.3 | 100 | 80.5 | 100 | 69.6 | 93.0 | 7.0 |
| 6335-11-750 | Sulfates | 66 | 29 | 5 | 71.4 | 100 | 84.8 | 100 | 69.2 | 81.1 | 12.9 |
| 6335-22-750 | Sulfates | 66 | 29 | 5 | 69.8 | 100 | 84.1 | 100 | 65.9 | 83.1 | 12.9 |

TABLE 2-continued

| | | | | | 200 C. | | 350 C. | | 500 C. | | N$_2$O |
| | Performance of 1.5 w % Fe & 0.4% Mn on TiZr supports | | | | NOx | NH$_3$ | NOx | NH$_3$ | NOx | NH$_3$ | Formation at |
| Catalyst Number | Ti & Zr Precursors | TiO$_2$ (mol %) | ZrO$_2$ (mol %) | SiO$_2$ (mol %) | Conversion (%) | Selectivity (%) | Conversion (%) | Selectivity (%) | Conversion (%) | Selectivity (%) | 500 C. (ppm) |
|---|---|---|---|---|---|---|---|---|---|---|---|
| Sulfate Average | Sulfates | 66 | 29 | 5 | 70.7 | 100 | 82.8 | 100 | 68.4 | 86.8 | 10.3 |
| 6355-42-750 | Chlorides | 66 | 29 | 5 | 66.3 | 100 | 81.2 | 100 | 55.9 | 73.0 | 14.7 |

As Table 2 shows, the sulfate catalyst gives superior performance in several areas. First is the NOx conversion at 200 C, second is NOx conversion at 500 C, third is NH$_3$ selectivity at 500 C, and fourth is a reduced amount of N$_2$O formation at 500 C.

Although not being bound by theory, the differences in performance, particularly at high temperature may be explained as being related to the porosity of the respective TiZr mixed oxide materials. FIG. 3, which shows SEM images of the porous support prepared from sulfate precursors and prior art supports (prepared according to Comparative Example 1) at the same magnification. These show that the porous support prepared from sulfate precursors is much less densely packed than the prior art material, which should allow improved diffusion of vapor phase molecules to the active site. This will improve conversion, selectivity as well as reduce by-product (N$_2$O) formation particularly at higher temperatures.

The invention has been described with reference to its preferred embodiments. Variations and modifications of the invention will be obvious to those skilled in the art from the foregoing description. It is intended that all of these variations and modifications be included within the scope of the appended claims.

What is claimed is:

1. A composition for the catalytic reduction of NO$_x$ compounds, comprising an active catalyst component deposited on the surface of a porous support; wherein said active component comprises one or more first metal(s) and/or metal oxide(s); and wherein said porous support comprises:
   a) a crystalline phase comprising titanium dioxide, a titanium-zirconium mixed oxide or a mixture of titanium dioxide and a titanium-zirconium mixed oxide;
   b) an amorphous phase that comprises zirconium oxide; and
   c) about 0.1% to about 5% by weight of one or more of second metal oxide(s) and/or a metalloid oxide(s) deposited on the surface of said catalyst support, wherein said second metal oxide(s) may be the same or different than the first metal oxide;
   wherein said first metal(s) and/or metal oxide(s) exhibit catalytic activity for reduction of NOx compounds; and greater than 25% of the pore volume of said porous support is comprised of pores with a diameter greater than 150 angstroms.

2. The composition of claim 1, wherein the crystalline phase comprises anatase titanium dioxide.

3. The composition of claim 1, wherein the crystalline phase comprises a titanium/zirconium mixed oxide.

4. The composition of claim 3, wherein the molar ratio of titanium to zirconium in the titanium/zirconium mixed oxide is about 2:1.

5. The composition of claim 1, wherein said amorphous phase is present on the surface of said crystalline phase.

6. The composition of claim 1, wherein the crystalline phase of the porous support comprises about 90 mol % to about 100 mol % anatase titanium dioxide and a mixed titanium/zirconium mixed oxide.

7. The composition of claim 1, wherein the crystalline phase of the porous support comprises about 95 mol % to about 100 mol % anatase titanium dioxide and a mixed titanium/zirconium mixed oxide.

8. The composition of claim 1, wherein the active catalyst component is an oxide of manganese, iron, or cerium, or a combination thereof.

9. The composition of claim 1, wherein the second metal oxide in d) is titanium dioxide.

10. The composition of claim 9, wherein the porous support comprises a molar ratio of titanium to zirconium of about 60:40 to about 95:5.

11. The composition of claim 9, wherein the porous support comprises a molar ratio of titanium to zirconium of about 65:35 to about 85:15.

12. The composition of claim 9, wherein the porous support comprises a molar ratio of titanium to zirconium of about 75:25 to about 90:10.

13. The composition of claim 1, wherein the composition comprises about 1% to about 20% active catalyst component by weight of the composition.

14. The composition of claim 1, wherein the composition comprises about 5% to about 10% active catalyst component by weight of the composition.

15. A porous catalyst support for supporting an active DeNOx catalyst component comprising:
   a) a crystalline phase comprising titanium dioxide, a titanium-zirconium mixed oxide or a mixture of titanium dioxide and a titanium-zirconium mixed oxide;
   b) an amorphous phase that comprises zirconium oxide;
   c) about 0.1% to about 5% by weight of one or more metal oxide(s) and/or metalloid oxide(s) deposited on the surface of said crystalline and/or amorphous phases;
   wherein said metal oxide(s) or metalloid oxide(s) are not substantially active in the reduction of NOx compounds; and wherein greater than 25% of the pore volume of the catalyst support is comprised of pores with a diameter greater than 150 angstroms.

16. A method for the preparation of the composition of claim 1 comprising:
   a) contacting a mixture of a soluble titanyl salt and a soluble zirconyl salt with an aqueous solvent at a pH of about 4 to about 12 in the presence of a sulfate compound to precipitate a TiO$_2$/ZrO$_2$ porous support comprising a crystalline phase and an amorphous phase;

wherein the crystalline phase comprises $TiO_2$, $ZrO_2$ and/or a mixed $TiO_2/ZrO_2$ mixed oxide; and wherein the amorphous phase comprises $ZrO_2$;

b) contacting the $TiO_2/ZrO_2$ porous support of step b) with precursors of one or more metal oxide(s) and/or a metalloid oxide(s) to produce a $TiO_2/ZrO_2$ porous support comprising 0.1% to 2% by weight of one or more metal oxide(s) and/or metalloid oxide(s) on the surface of said porous support; and c) contacting the $TiO_2/ZrO_2$ porous support comprising 0.1% to 2% by weight of one or more metal oxide(s) or metalloid oxide(s) of step b) with an active catalyst precursor to deposit an active catalyst component on the $TiO_2/ZrO_2$ porous support; and d) contacting the $TiO_2/ZrO_2$ porous support of step c) with an aqueous mixture comprising a carbonate or bicarbonate salt to form a composition for the catalytic reduction of NOx.

17. The method of claim 16, wherein the metal oxide in step c) is $TiO_2$.

18. The method of claim 16, wherein the active metal catalyst component is an oxide of manganese, iron, cerium or a combination thereof.

19. The method of claim 16, wherein the crystalline phase of the $TiO_2/ZrO_2$ porous support comprises anatase titanium dioxide.

20. The method of claim 16, wherein the crystalline phase of the $TiO_2/ZrO_2$ catalyst support particles comprises a titanium/zirconium mixed oxide.

21. The method of claim 20, wherein the titanium/zirconium mixed oxide has a molar ratio of about 2:1, titanium to zirconium.

22. The method of claim 16, wherein the crystalline phase of the $TiO_2/ZrO_2$ porous support comprises about 90 mol % to about 100 mol % anatase titanium dioxide and a mixed titanium/zirconium mixed oxide.

23. The method of claim 16, wherein the crystalline phase of the $TiO_2/ZrO_2$ porous support comprises about 95 mol % to about 100 mol % anatase titanium dioxide and a mixed titanium/zirconium mixed oxide.

24. The method of claim 16, wherein in step d) the carbonate or bicarbonate salt is ammonium carbonate.

25. The method of claim 16, further comprising filtering the $TiO_2/ZrO_2$ porous support after step c) and washing the solid to remove spectator ions until the conductivity of the wash liquor use in the washing step is less than or equal to 100 mS/cm.

26. The method of claim 16, further comprising filtering the composition of step d) and washing the solid to remove spectator ions until the conductivity of the wash liquor used in the washing step is less than or equal to 100 mS/cm.

27. The method of claim 16, further comprising drying the $TiO_2/ZrO_2$ porous support after step c).

28. The method of claim 16, further comprising calcining the composition after step d).

29. The method of claim 28, wherein the composition is calcined at a temperature of between 400° C. and 700° C. for 2 to 10 hours.

30. A method for the preparation the porous catalyst support of claim 15 comprising:

a) contacting a mixture of a soluble titanyl and a soluble zirconyl salt in the presence of a sulfate compound with an aqueous solvent at a pH of about 4 to about 12 to precipitate a $TiO_2/ZrO_2$ porous support comprising a crystalline phase and an amorphous phase;

wherein the crystalline phase comprises $TiO_2$, $ZrO_2$ and/or a mixed $TiO_2/ZrO_2$ mixed oxide; and wherein the amorphous phase comprises $ZrO_2$;

b) contacting the $TiO_2/ZrO_2$ porous support of step a) with precursors of one or metal oxide(s) or metalloid oxide(s) to produce a $TiO_2/ZrO_2$ porous support comprising 0.1% to 2% by weight of one or more metal oxide(s) or metalloid oxide(s) on the surface of said porous support; and c) contacting the $TiO_2/ZrO_2$ porous support of step b) with an aqueous mixture comprising a carbonate or bicarbonate salt to form the porous support.

31. A method of reducing NOx compounds in a gas or liquid comprising contacting the gas or liquid with a composition according to claim 1 for a time sufficient to reduce the level of NOx compounds in said gas or liquid.

* * * * *